United States Patent
Lee et al.

(10) Patent No.: US 12,489,180 B2
(45) Date of Patent: Dec. 2, 2025

(54) LITHIUM SECONDARY BATTERY AND METHOD FOR MANUFACTURING THE SAME

(71) Applicant: LG ENERGY SOLUTION, LTD., Seoul (KR)

(72) Inventors: Jung-Pil Lee, Daejeon (KR); Guilong Jin, Daejeon (KR); Eun-Bee Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 677 days.

(21) Appl. No.: 17/420,858

(22) PCT Filed: Sep. 17, 2020

(86) PCT No.: PCT/KR2020/012584
§ 371 (c)(1),
(2) Date: Jul. 6, 2021

(87) PCT Pub. No.: WO2021/071125
PCT Pub. Date: Apr. 15, 2021

(65) Prior Publication Data
US 2022/0094027 A1    Mar. 24, 2022

(30) Foreign Application Priority Data
Oct. 11, 2019 (KR) .......................... 10-2019-0126329

(51) Int. Cl.
*H01M 50/572* (2021.01)
*H01M 4/02* (2006.01)
(Continued)

(52) U.S. Cl.
CPC ......... *H01M 50/572* (2021.01); *H01M 4/134* (2013.01); *H01M 4/1391* (2013.01);
(Continued)

(58) Field of Classification Search
CPC ........... H01M 4/525; H01M 2004/027; H01M 2220/20; H01M 4/8657
See application file for complete search history.

(56) References Cited

U.S. PATENT DOCUMENTS

2010/0129699 A1    5/2010   Mikhaylik et al.
2014/0127577 A1*   5/2014   Fleischmann ......... H01M 4/628
                                                    429/215
(Continued)

FOREIGN PATENT DOCUMENTS

CN    109598365 A    4/2019
CN    109841780 A    6/2019
(Continued)

OTHER PUBLICATIONS

International Search Report (PCT/ISA/210) issued in PCT/KR2020/012584, dated Dec. 18, 2020.
(Continued)

*Primary Examiner* — Jonathan G Leong
*Assistant Examiner* — Taeyoung Son
(74) *Attorney, Agent, or Firm* — Birch, Stewart, Kolasch & Birch, LLP (57) ABSTRACT

The present disclosure relates to a lithium secondary battery including a protective layer and a volume-expandable layer, a method for manufacturing the lithium secondary battery, and a system for evaluating the safety of the lithium secondary battery. According to the present disclosure, it is possible to inhibit growth of lithium dendrite primarily by forming a protective layer. It is also possible to inhibit growth of lithium dendrite secondarily by forming a volume-expandable layer. Therefore, it is possible to provide a lithium secondary battery fundamentally prevented from a short-circuit.

12 Claims, 2 Drawing Sheets

(51) Int. Cl.
  *H01M 4/134*     (2010.01)
  *H01M 4/1391*    (2010.01)
  *H01M 4/1395*    (2010.01)
  *H01M 4/505*     (2010.01)
  *H01M 4/525*     (2010.01)
  *H01M 4/62*      (2006.01)
  *H01M 10/0525*   (2010.01)
  *H01M 10/058*    (2010.01)

(52) U.S. Cl.
  CPC ......... *H01M 4/1395* (2013.01); *H01M 4/505* (2013.01); *H01M 4/525* (2013.01); *H01M 4/623* (2013.01); *H01M 10/0525* (2013.01); *H01M 10/058* (2013.01); *H01M 2004/027* (2013.01); *H01M 2004/028* (2013.01); *H01M 2220/20* (2013.01)

(56) References Cited

U.S. PATENT DOCUMENTS

| | | |
|---|---|---|
| 2017/0279163 A1 | 9/2017 | Jang et al. |
| 2018/0114968 A1* | 4/2018 | Joo ................. H01M 50/42 |
| 2018/0294476 A1 | 10/2018 | Zhamu et al. |
| 2019/0123325 A1 | 4/2019 | Park et al. |
| 2019/0198841 A1 | 6/2019 | Pol et al. |
| 2019/0198938 A1 | 6/2019 | Fujita et al. |
| 2019/0237732 A1* | 8/2019 | Hu ................... H01M 50/417 |
| 2019/0260091 A1* | 8/2019 | Rho ................. H01M 4/0404 |
| 2020/0212446 A1* | 7/2020 | Xiao ................ H01M 4/0402 |
| 2020/0251728 A1 | 8/2020 | Song et al. |
| 2020/0303707 A1 | 9/2020 | Zhou et al. |

FOREIGN PATENT DOCUMENTS

| | | |
|---|---|---|
| CN | 109980164 A | 7/2019 |
| EP | 3 203 548 A1 | 8/2017 |
| JP | 2006-59714 A | 3/2006 |
| JP | 2013-73924 A | 4/2013 |
| JP | 5748108 B2 | 7/2015 |
| JP | 2019-57382 A | 4/2019 |
| KR | 10-2009-0086575 A | 8/2009 |
| KR | 10-2015-0109240 A | 10/2015 |
| KR | 10-2018-0064197 A | 6/2018 |
| KR | 10-2018-0093288 A | 8/2018 |
| KR | 10-2019-0007246 A | 1/2019 |
| KR | 10-2019-0044450 A | 4/2019 |

OTHER PUBLICATIONS

Extended European Search Report for European Application No. 20874627.1, dated Mar. 14, 2022.

* cited by examiner

FIG. 1

CONVENTIONAL ART

FIG. 2

FIG. 3

LITHIUM SECONDARY BATTERY AND METHOD FOR MANUFACTURING THE SAME

TECHNICAL FIELD

The present disclosure relates to a lithium secondary battery and a method for manufacturing the same.

The present application claims priority to Korean Patent Application No. 10-2019-0126329 filed on Oct. 11, 2019 in the Republic of Korea, the disclosures of which are incorporated herein by reference.

BACKGROUND ART

As vehicles, computers and portable terminals have been increasingly used, importance of lithium secondary batteries is increased. Particularly, there is an increasing need for development of lithium secondary batteries having a light weight and high energy density.

Such lithium secondary batteries may be obtained by interposing a separator between a positive electrode and a negative electrode and injecting a liquid electrolyte thereto, or by interposing a separator including a solid electrolyte between a positive electrode and a negative electrode, instead of a liquid electrolyte.

Meanwhile, in a lithium secondary battery, lithium metal may be deposited on the negative electrode depending on condition of use, and the deposited lithium metal may grow in the form of dendrite. When such dendrite grows continuously, it may be in contact with the positive electrode to cause an internal short-circuit in the battery. Particularly, when using lithium metal as a negative electrode to provide high energy density, lithium ions present in the lithium metal negative electrode meets electrons to cause plating on the surface of the lithium metal negative electrode. In this case, lithium dendrite grows more easily, as compared to use of any negative electrode active material other than lithium metal, which becomes a significantly serious problem.

The present disclosure intends to fundamentally solve the problem of growth of lithium dendrite formed from the negative electrode during the operation of a battery and a short-circuit generated by the contact of the lithium dendrite with the positive electrode.

DISCLOSURE

Technical Problem

The present disclosure is designed to solve the problems of the related art, and therefore the present disclosure is directed to inhibiting growth of lithium dendrite fundamentally and preventing generation of a short-circuit.

The present disclosure is also directed to providing a lithium secondary battery which has improved safety and causes no internal short-circuit.

In addition, the present disclosure is directed to providing a lithium secondary battery having high energy density.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a lithium secondary battery including: a negative electrode; a protective layer disposed on the negative electrode; a volume-expandable layer disposed on the protective layer; a separating layer disposed on the volume-expandable layer; a positive electrode disposed on the separating layer; and an electrolyte, wherein the volume-expandable layer includes: a binder polymer (a); and inorganic particles (b) capable of lithium ions or lithium intercalation, and the inorganic particles (b) are lithiatiable through a physical, chemical or electrochemical reaction with lithium ions or lithium, and includes a metal or a metal oxide undergoing volume expansion through lithiation, or both.

According to the second embodiment of the present disclosure, there is provided the lithium secondary battery as defined in the first embodiment, wherein the inorganic particles (b) show a volume expansion ratio of 10-1,000% after lithiation, on the basis of the volume before lithiation.

According to the third embodiment of the present disclosure, there is provided the lithium secondary battery as defined in the first or the second embodiment, wherein the inorganic particles (b) include Si, Sn, SiO, SnO, $MnO_2$, $Fe_2O_3$, or two or more of them.

According to the fourth embodiment of the present disclosure, there is provided the lithium secondary battery as defined in any one of the first to the third embodiments, wherein the inorganic particles (b) are used in an amount of 10-99 parts by weight based on 100 parts by weight of the volume-expandable layer.

According to the fifth embodiment of the present disclosure, there is provided the lithium secondary battery as defined in any one of the first to the fourth embodiments, wherein the protective layer is a polymer layer.

According to the sixth embodiment of the present disclosure, there is provided the lithium secondary battery as defined in the fifth embodiment, wherein the polymer layer has an electrical insulation property and includes a polymer.

According to the seventh embodiment of the present disclosure, there is provided the lithium secondary battery as defined in the sixth embodiment, wherein the polymer includes any one selected from the group consisting of polyvinylidene fluoride, polyvinyl chloride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinylidene fluoride, polyvinyl acetate, polyethylene, polypropylene, polyethylene-co-vinyl acetate, polyethylene oxide, polypropylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a mixture of two or more of them.

According to the eighth embodiment of the present disclosure, there is provided the lithium secondary battery as defined in any one of the first to the seventh embodiments, wherein the volume-expandable layer has a thickness of 10 nm to 50 μm.

According to the ninth embodiment of the present disclosure, there is provided the lithium secondary battery as defined in any one of the first to the eighth embodiments, wherein the electrolyte is a solid electrolyte or a liquid electrolyte.

According to the tenth embodiment of the present disclosure, there is provided the lithium secondary battery as defined in any one of the first to the ninth embodiments, wherein the pores in the protective layer, the volume-expandable layer and the separating layer are impregnated with the solid electrolyte or the liquid electrolyte.

According to the eleventh embodiment of the present disclosure, there is provided the lithium secondary battery as defined in any one of the first to the tenth embodiments, wherein the binder polymer (a) includes any one selected from polyvinylidene fluoride, polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or two or more of them.

According to the twelfth embodiment of the present disclosure, there is provided the lithium secondary battery as defined in any one of the first to the eleventh embodiments, wherein the separating layer includes a porous polymer film substrate or a porous polymer non-woven web substrate.

In another aspect of the present disclosure, there is also provided a method for manufacturing a lithium secondary battery according to any one of the following embodiments.

According to the thirteenth embodiment of the present disclosure, there is provided a method for manufacturing a lithium secondary battery including a negative electrode, a protective layer disposed on the negative electrode, a volume-expandable layer disposed on the protective layer, a separating layer disposed on the volume-expandable layer, a positive electrode disposed on the separating layer, and an electrolyte, the method including the steps of:
disposing the protective layer on the negative electrode;
disposing the volume-expandable layer on the separating layer; and
stacking the negative electrode, the protective layer, the volume-expandable layer, the separating layer and the positive electrode, successively,
wherein the volume-expandable layer includes a binder polymer (a), and inorganic particles (b) capable of lithium ions or lithium intercalation, and
the inorganic particles (b) are lithiatiable through a physical, chemical or electrochemical reaction with lithium ions or lithium, and includes a metal or a metal oxide undergoing volume expansion through lithiation, or both.

Advantageous Effects

According to an embodiment of the present disclosure, it is possible to inhibit growth of lithium dendrite primarily by forming a protective layer on a negative electrode.

According to an embodiment of the present disclosure, it is possible to inhibit growth of lithium dendrite secondarily by allowing a separating layer and a protective layer to be spaced apart from each other by the inorganic particles contained in the volume-expandable layer. Therefore, it is possible to inhibit an internal short-circuit between the positive electrode and the negative electrode fundamentally.

In addition, according to an embodiment of the present disclosure, it is possible to provide a lithium secondary battery which has high energy density by virtue of the use of a lithium metal negative electrode and shows improved safety by virtue of the use of a solid electrolyte.

Further, according to an embodiment of the present disclosure, it is possible to provide a method for manufacturing the above-mentioned lithium secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements, unless otherwise stated.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a lithium secondary battery and a method for manufacturing the same. The lithium secondary battery according to the present disclosure is provided with a protective layer on the negative electrode to inhibit growth of lithium dendrite primarily. In addition, the lithium secondary battery includes inorganic particles, which are lithiatiable with lithium or lithium ions in a volume-expandable layer to inhibit growth of lithium dendrite secondarily, and thus to inhibit an internal short-circuit fundamentally. In this manner, it is possible to provide a lithium secondary battery having improved safety, and a method for manufacturing the same.

Figure 1:
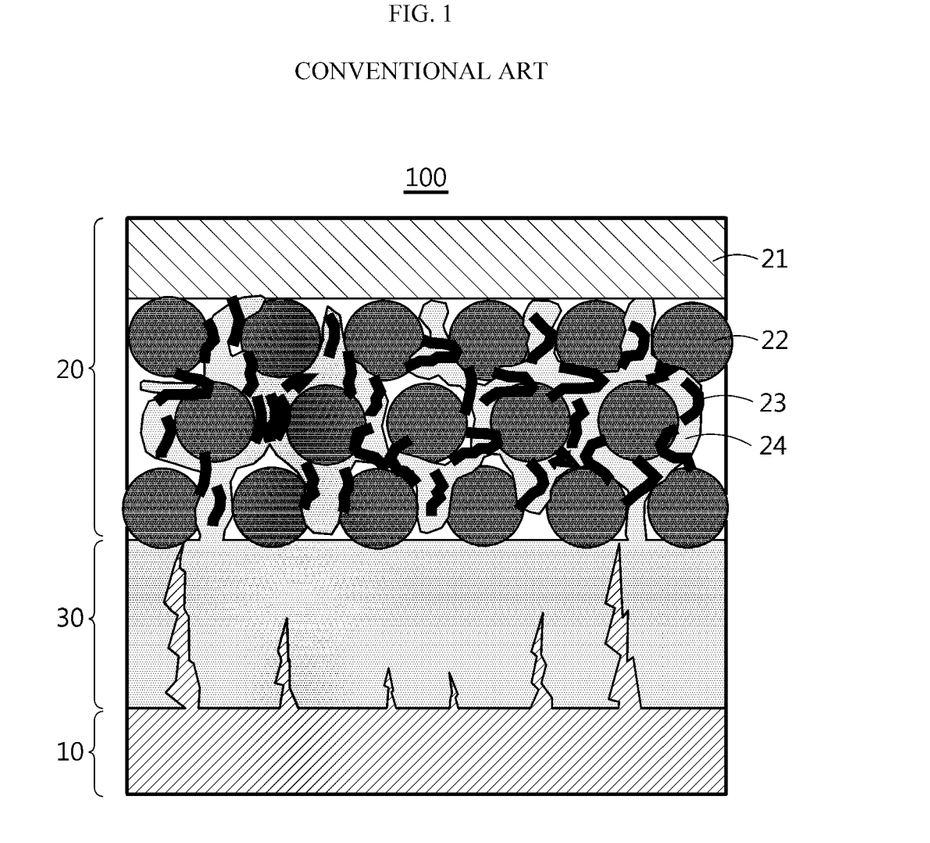
FIG. 1 is a schematic view illustrating the problem of growth of lithium dendrite from the negative electrode of a conventional lithium secondary battery, resulting in a short-circuit.
Figure 2:
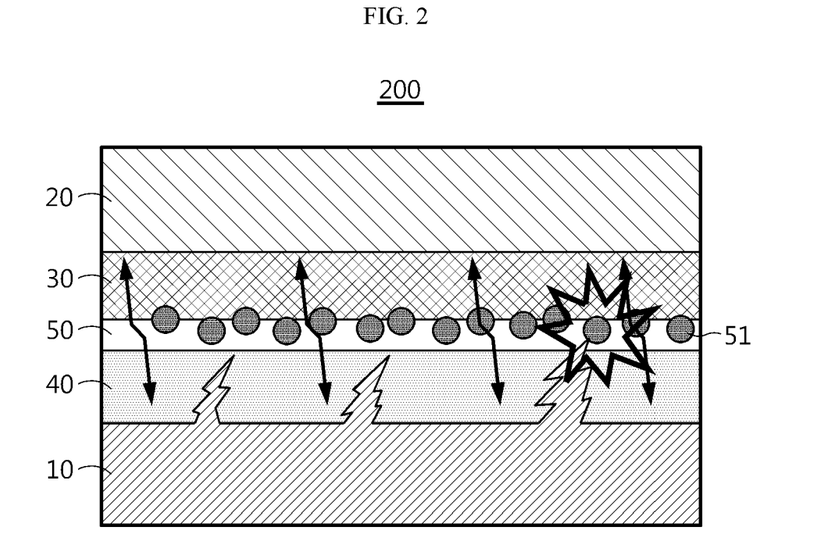
FIG. 2 and FIG. 3 are schematic views each illustrating the lithium secondary battery including a volume-expandable layer according to an embodiment of the present disclosure, wherein growth of lithium dendrite is inhibited by inorganic particles or the volume-expandable layer including the same.
Figure 3:
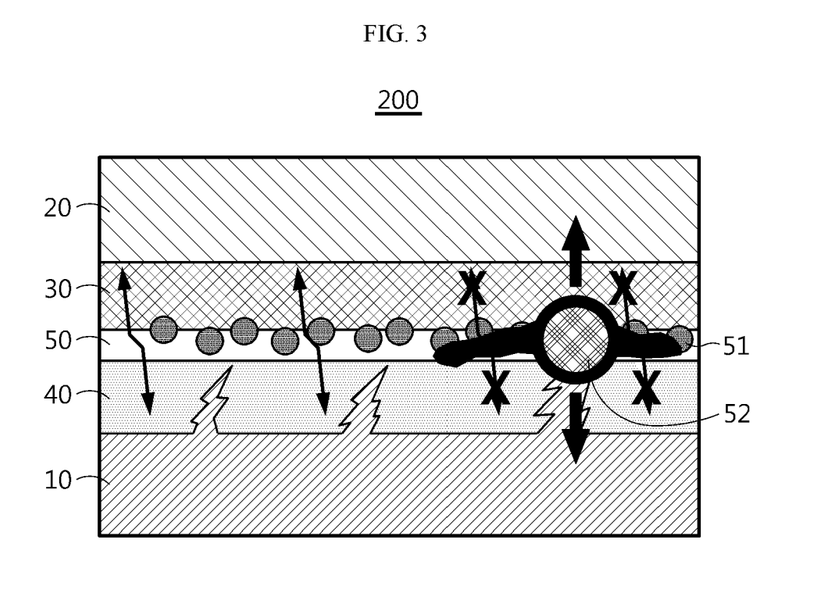

FIG. 1 is a schematic view illustrating the problem of growth of lithium dendrite from the negative electrode of a conventional lithium secondary battery, resulting in a short-circuit. FIG. 2 and FIG. 3 are schematic views each illustrating the lithium secondary battery according to an embodiment of the present disclosure, wherein growth of lithium dendrite is inhibited by the volume-expandable layer including inorganic particles. Hereinafter, the present disclosure will be explained in more detail with reference to the accompanying drawings.

Referring to FIG. 1, a conventional lithium secondary battery 100 generally has a layered structure formed by integrating particle-shaped ion conductive inorganic materials. Herein, the structure includes a plurality of pores derived from the interstitial volumes among the particles. Lithium dendrite grown from a negative electrode 10 through the space provided by the pores may be in contact with a positive electrode 10 to cause a short-circuit.

On the contrary, the lithium secondary battery 200 according to an embodiment of the present disclosure includes a protective layer 40 and a volume-expandable layer 50, and thus may fundamentally inhibit a short-circuit caused by growth of lithium dendrite during the operation of the battery. This are shown in FIG. 2 and FIG. 3.

Referring to FIG. 2 and FIG. 3, the lithium secondary battery 200 according to an embodiment of the present disclosure includes: a negative electrode 10; a protective layer 40 disposed on the negative electrode 10; a volume-expandable layer 50 disposed on the protective layer 40; a separating layer 30 disposed on the volume-expandable layer 50; a positive electrode 20 disposed on the separating layer 30; and an electrolyte (not shown).

In other words, the present disclosure provides a lithium secondary battery including a protective layer and a volume-expandable layer.

According to an embodiment of the present disclosure, the protective layer 40 is disposed on the negative electrode. Lithium dendrite may be grown from the negative electrode during the operation of the battery. According to an embodiment of the present disclosure, the lithium second battery includes the protective layer on the negative electrode, and thus can primarily inhibit growth of lithium dendrite. The protective layer also functions to prevent the volume-expandable layer from being in direct contact with the negative electrode. If the protective layer is not present and the volume-expandable layer is in direct contact with the negative electrode, the inorganic particles present in the volume-expandable layer may react directly with the negative electrode to accelerate growth of lithium dendrite, or the inorganic particles may be lithiated to cause a non-controllable reaction, such as explosion. In other words, the protective layer according to the present disclosure inhibits direct contact between the negative electrode and the volume-expandable layer and is formed directly on the negative electrode to reduce interfacial resistance, thereby providing improved life characteristics to the battery.

The protective layer may be coated or applied directly on the negative electrode.

According to an embodiment of the present disclosure, the protective layer may be a porous polymer layer. The porous polymer layer may include a polymer, and the polymer may include any one selected from the group consisting of polyvinylidene fluoride, polyvinyl chloride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinylidene fluoride, polyvinyl acetate, polyethylene, polypropylene, polyethylene-co-vinyl acetate, polyethylene oxide, polypropylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a mixture of two or more of them.

Since such a polymer layer made of a polymer is used, the protective layer may be prepared in the form of a thin film, and the battery may have high energy density.

In addition, the lithium secondary battery 200 according to an embodiment of the present disclosure includes a volume-expandable layer 50 between the protective layer 40 and the separating layer 30.

The volume-expandable layer includes a binder polymer (a) and inorganic particles (b).

The inorganic particles (b) are capable of lithium or lithium ions intercalation. The inorganic particles are in direct contact with lithium dendrite generated at the negative electrode during the operation of the battery and is electrically connected with the negative electrode. In addition, the inorganic particles show a negative electrode potential. Therefore, the inorganic particles can function like a negative electrode active material. Then, as the battery is operated, lithium ions supplied from the positive electrode or lithium grown from lithium dendrite reacts physically, chemically or electrochemically with the inorganic particles, and thus the inorganic particles are lithiated.

Herein, the lithium may be a lithium atom itself. Since lithium has electrical conductivity and may have a negative electrode potential, when being in contact with the inorganic particles by lithium dendrite, it may cause lithiation of the inorganic particles upon the contact with the inorganic particles.

As shown in FIG. 3, lithiated inorganic particles undergo volume expansion and generate dead spaces or voids between the protective layer and the separating layer. Then, ions cannot be transported to the generated spaces or voids, resulting in a rapid increase in resistance in the lithium secondary battery so that growth of lithium dendrite may be stopped. In this manner, it is possible to fundamentally inhibit a short-circuit between the negative electrode and the positive electrode. Such an effect may be more effective, particularly when using a solid electrolyte, due to the lack of electrolyte migration. Meanwhile, even when using a liquid electrolyte, it is required to minimize the electrolyte remaining in the battery with a view to high energy density. Therefore, when lithium dendrite is grown as mentioned above, the voids cannot be filled up totally. Thus, a short-circuit between the positive electrode and the negative electrode can be still inhibited.

According to an embodiment of the present disclosure, the inorganic particles (b) is capable of lithium ions or lithium intercalation. Herein, lithium ions or lithium forms a composite with the inorganic particles through a physical, chemical or electrochemical reaction with the inorganic particles.

Therefore, once the inorganic particles (b) are lithiated with lithium ions or lithium, the lithium ions or lithium cannot be deintercalated and the inorganic particles cannot be recovered to their states before lithiation. In other words, when ion conduction to the inorganic particles is not allowed by the generation of voids or dead spaces, or the inorganic particles are spaced apart from lithium dendrite due to discharge and are in an electrically insulated state, the lithiated inorganic particles cannot be deintercalated and cannot be recovered to their states before lithiation.

According to an embodiment of the present disclosure, the inorganic particles (b) are lithiatiable through a physical, chemical or electrochemical reaction with lithium ions or lithium, and may include a metal, a metal oxide, or both.

Particularly, when the inorganic particle is a metal, the lithiation may be lithiation of the inorganic metal particles with lithium ions or lithium into the form of an alloy.

Particularly, when the inorganic particle is a metal oxide, the lithiation may be formation of a composite of the inorganic metal oxide particles with lithium ions or lithium and chemical bonding of the metal oxide with lithium. More particularly, the lithiation may include a reaction of the inorganic particles as shown in the following Formula 1:

$$X(Li)+Y(M) \rightarrow Li_xM_y$$ [Formula 1]

wherein M includes Si, Sn, SiO, SnO, MnO$_2$, or two or more of them, each of x and y is determined by the oxidation number of M, and each of X and Y represents an integer of 1 or more.

When the inorganic particles include both a metal and a metal oxide, the same Formula may also be applied.

According to an embodiment of the present disclosure, the inorganic particles (b) undergo volume expansion through lithiation with lithium ions or lithium.

In other words, since such volume-expandable inorganic particles are used according to the present disclosure, voids may be generated between the protective layer and the separating layer, as the battery is operated. Migration of lithium ions or lithium may be limited fundamentally through the generation of voids. As the resistance of the battery is increased, the battery may be degraded with no micro short-circuit. That is to say, according to an embodiment of the present disclosure, it is possible to fundamentally prevent a safety problem caused by a short-circuit.

To accomplish this, the inorganic particles (b) are disposed in such a manner that they may not be in direct contact with an electrode. In other words, the inorganic particles are disposed between the protective layer and the separating layer, and can fundamentally inhibit growth of lithium dendrite generated during the operation of the battery.

According to an embodiment of the present disclosure, the inorganic particles may be closely concentrated in order to generate voids in the volume-expandable layer through their volume expansion.

According to an embodiment of the present disclosure, the inorganic particles (b) show a volume expansion ratio of 10-1,000%, 20-500%, or 50-300%, after lithiation, on the basis of the volume before lithiation. In other words, when the inorganic particles (b) are lithiated with lithium ions or lithium, lithiated inorganic particles (c) are produced and the lithiated inorganic particles have a significantly larger volume as compared to the inorganic particles (b).

Herein, the lithiated inorganic particles (c) may be represented by the following Formula 2:

$$Li_xM_y$$ [Formula 2]

wherein M includes Si, Sn, SiO, SnO, MnO$_2$, or two or more of them, and each of x and y is determined by the oxidation number of M.

According to an embodiment of the present disclosure, the inorganic particles (b) include a metal or a metal oxide. Particularly, the inorganic particles may include Si, Sn, SiO, SnO, MnO$_2$, Fe$_2$O$_3$, or two or more of them.

Particularly, Si may be used suitably to solve the technical problem according to the present disclosure, since it shows a volume expansion ratio of up to about 300% after lithiation, on the basis of the volume before lithiation.

According to an embodiment of the present disclosure, the inorganic particles (b) may be used in an amount of 10-99 parts by weight, 15-95 parts by weight, or 20-90 parts by weight, based on 100 parts by weight of the volume-expandable layer.

According to an embodiment of the present disclosure, the volume-expandable layer may have a thickness of less than 50 μm, preferably 10 μm or less. For example, the volume-expandable layer may be formed with a significantly small thickness, such as a nanometer-scaled thickness of 1 μm or less, 100 nm or less, or 10 nm or less.

According to an embodiment of the present disclosure, the volume-expandable layer may be coated on the separating layer at a ratio of less than 90%, less than 50%, or less than 30%, based on 100 area % of the surface of the separating layer. When the volume-expandable layer is coated within the above-defined range, it is possible to maximize improvement of safety, while minimizing a decrease in ion conductivity.

According to an embodiment of the present disclosure, the binder polymer (a) thoroughly functions as a binder with which the inorganic particles are interconnected with one another and are fixed stably, and thus contributes to preventing degradation of mechanical properties of the volume-expandable layer.

In addition, it is not essentially required for the binder polymer to have ion conductivity. However, when using a polymer having ion conductivity, it is possible to further improve the performance of an electrochemical device. Therefore, a binder polymer having a dielectric constant as high as possible may be used. In fact, since the dissociation degree of a salt in an electrolyte depends on the dielectric constant of the solvent for the electrolyte, a binder polymer having a higher dielectric constant can improve the salt dissociation degree in an electrolyte. The binder polymer may have a dielectric constant ranging from 1.0 to 100 (measured at a frequency of 1 kHz), particularly 10 or more.

In addition to the above-mentioned function, the binder polymer may be characterized in that it is gelled upon the impregnation with a liquid electrolyte and thus shows a high degree of swelling. Thus, the binder polymer has a solubility parameter (i.e., Hildebrand solubility parameter) of 15-45 MPa$^{1/2}$ or 15-25 MPa$^{1/2}$ and 30-45 MPa$^{1/2}$. Therefore, hydrophilic polymers having many polar groups may be used more frequently as compared to hydrophobic polymers, such as polyolefins. When the solubility parameter is less than 15 MPa$^{1/2}$ and more than 45 MPa$^{1/2}$, it is difficult for the binder polymer to be swelled with a conventional liquid electrolyte for a battery.

The binder polymer attaches the inorganic particles to one another so that they may retain their binding states. For example, the binder polymer connects and fixes the inorganic particles with one another.

Any binder polymer used conventionally in the art may be incorporated to the volume-expandable layer with no particular limitation. Non-limiting examples of the binder polymer include but are not limited to: polyvinylidene fluoride, polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or the like.

According to an embodiment of the present disclosure, the separating layer 30 is a porous film. Any porous film used conventionally as a separator material for an electrochemical device may be used with no particular limitation, as long as it can provide a lithium ion transport channel, while electrically insulating the positive electrode and the negative electrode from each other to prevent a short-circuit.

Particularly, the separating layer may be a porous polymer film substrate, a porous polymer non-woven web substrate, or a film capable of swelling with an electrolyte.

The porous polymer film substrate may be a porous polymer film including polyolefin, such as polyethylene or polypropylene. Such a polyolefin porous polymer film substrate may realize a shut-down function at a temperature of 80-130° C.

Herein, the polyolefin porous polymer film substrate may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and the porous polymer nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

Although there is no particular limitation in the thickness of the separating layer, the separating layer may have a thickness of 1-100 μm, more particularly 2-50 μm. Since batteries have been provided with high output/high capacity recently, the separating layer may be provided in the form of a thin film, preferably. The pores present in the separating layer may have a diameter of 10-100 nm, 10-70 nm, 10-50 nm, or 10-35 nm, and a porosity of 5-90%, preferably 20-80%. However, such a range may be modified with ease as necessary or according to a particular embodiment.

The pores of the separating layer may have various types of pore structures, and any pore structure falls within the scope of the present disclosure, as long as any one of the average pore sizes determine by using a porosimeter or observed through FE-SEM (field emission-scanning electron microscopy) satisfies the above-defined condition.

Herein, in the case of a generally known monoaxial dry separating layer, the median pore size, not the pore size in the machine direction (MD) but the pore size in the transverse direction (TD) in FE-SEM is taken as a base. In a variant, in the case of a separating layer having a network structure (e.g. wet PE separator), the pore size determined by using a porosimeter may be taken as a base.

Meanwhile, when the separating layer is a swellable film, it may include no pores or include less than 50% of pores. In this case, ion conduction may be carried out, while a gap between polymer chains is impregnated with the electrolyte. Therefore, it is possible to operate a battery without pores. Such materials include polyethylene oxide (PEO), polymethyl methacrylate (PMMA), polyacrylonitrile (PAN), polytetrafluoroethylene (PTFE), polyvinylidene fluoride (PVdF), or the like.

According to an embodiment of the present disclosure, the electrolyte may be a solid electrolyte or a liquid electrolyte. Herein, the electrolyte may be incorporated to the pores in the protective layer, the volume-expandable layer and the separating layer. The electrolyte also exists in the electrode active material layer of the electrode.

When the electrolyte is a solid electrolyte, the solid electrolyte includes an ion conductive solid electrolyte material. For example, the solid electrolyte material may be applied as an ion conductive electrolyte to a solid state battery using no liquid electrolyte. The ion conductive solid electrolyte material may have an ion conductivity of $10^{-5}$ S/cm or more at the operating temperature of a battery.

The solid electrolyte material may include a polymeric solid electrolyte, an inorganic solid electrolyte or a mixture thereof.

According to an embodiment of the present disclosure, the polymeric solid electrolyte includes a polymer resin and a lithium salt, and may be a solid polymeric electrolyte provided as a mixture of a solvated lithium salt with a polymer resin, or a polymer gel electrolyte prepared by impregnating a polymer resin with an organic electrolyte containing an organic solvent and a lithium salt.

For example, the solid polymeric electrolyte may include, as a polymer resin, any one selected from the group consisting of a polyether polymer, a polycarbonate polymer, an acrylate polymer, a polysiloxane polymer, a phosphazene polymer, polyethylene derivatives, alkylene oxide derivatives, a phosphate polymer, polyalginate lysine, polyester sulfide, polyvinyl alcohol, polyvinylidene fluoride and a polymer containing an ionically dissociable group, or a mixture of two or more of them. However, the scope of the present disclosure is not limited thereto.

According to an embodiment of the present disclosure, the solid polymeric electrolyte may include, as a polymer resin, any one selected from the group consisting of a branched copolymer, a comb-like polymer and a crosslinked polymer resin, including polyethylene oxide (PEO) backbone copolymerized with a comonomer including an amorphous polymer, such as PMMA, polycarbonate, polysiloxane (pdms) and/or phosphazene, or a mixture of two or more of them.

According to an embodiment of the present disclosure, the polymer gel electrolyte includes a lithium salt-containing organic electrolyte and a polymer resin, wherein the organic electrolyte is used in an amount of 60-400 parts by weight based on 100 parts by weight of the polymer resin. There is no particular limitation in the polymer resin used for the gel electrolyte, and particular examples of the polymer resin include any one selected from the group consisting of polyvinyl chloride (PVC) polymers, poly(methyl methacrylate) (PMMA) polymers, polyacrylonitrile (PAN), polyvinylidene fluoride (PVdF) and poly(vinylidene fluoride-co-hexafluoropropylene) (PVdF-HFP), or a mixture of two or more of them. However, the scope of the present disclosure is not limited thereto.

In addition, the lithium salt in the electrolyte is an ionizable lithium salt and may be represented by $Li^+X^-$. The anion (X) of lithium salt is not particularly limited, and particular examples thereof include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

Meanwhile, according to an embodiment of the present disclosure, the polymeric solid electrolyte material may further include an additional polymer gel electrolyte. The polymer gel electrolyte has high ion conductivity ($10^{-4}$ S/cm or more) and has a binding property so that it may provide not only a function as an electrolyte but also a function as an electrode binder resin imparting binding force in electrode active material particles and between an electrode layer and a current collector.

According to an embodiment of the present disclosure, the inorganic solid electrolyte may include a sulfide-based solid electrolyte, an oxide-based solid electrolyte, or both.

According to an embodiment of the present disclosure, the sulfide-based solid electrolyte is an electrolyte ingredient containing a sulfur atom and is not particularly limited. The sulfide-based solid electrolyte may include at least one of a crystalline solid electrolyte, non-crystalline solid electrolyte (vitreous solid electrolyte) and a glass ceramic solid electrolyte. Particular examples of the sulfide-based solid electrolyte may include, but are not limited to: LPS-type sulfides containing sulfur and phosphorus, $Li_{4-x}Ge_{1-x}P_xS_4$ (wherein x is 0.1-2, particularly x is 3/4, 2/3), $Li_{10±1}MP_2X_{12}$ (wherein M=Ge, Si, Sn, Al, X=S, Se), $Li_{3.833}Sn_{0.833}As_{0.16654}$, $Li_4SnS_4$, $Li_{3.25}Ge_{0.25}P_{0.75}S_4$, $Li_2S—P_2S_5$, $B_2S_3—Li_2S$, $xLi_2S-(100-x)P_2S_5$ (wherein x is 70-80), $Li_2S—SiS_2—Li_3N$, $Li_2S—P_2S_5—LiI$, $Li_2S—SiS_2—LiI$, $Li_2S—B_2S_3—LiI$, or the like.

According to an embodiment of the present disclosure, the oxide-based solid electrolyte may be selected suitably from LLT-based electrolytes with a perovskite structure, such as $Li_{3x}La_{2/3-x}TiO_3$, LISICON-based electrolytes, such as $Li_{14}Zn(GeO_4)_4$, LATP-based electrolytes, such as $Li_{1.3}Al_{0.3}Ti_{1.7}(PO_4)_3$, LAGP-based electrolytes, such as $(Li_{1+x}Ge_{2-x}Al_x(PO_4)_3)$, phosphate-based electrolytes, such as LiPON, or the like.

When the electrolyte is a liquid electrolyte, it may include a salt having a structure of $A^+B^-$, wherein $A^+$ includes an alkali metal cation such as $Li^+$, $Na^+$, $K^+$ or a mixture thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a mixture thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a mixture thereof. However, the present disclosure is not limited thereto.

According to an embodiment of the present disclosure, the negative electrode may include a current collector that is in contact with the negative electrode active material layer so that the current collector may support the negative electrode active material layer and may transport electrons between the negative electrode active material and an electric wire. In addition, according to an embodiment of the present disclosure, the negative electrode may consist of a current collector alone, without using a negative electrode active material layer.

The current collector is not particularly limited, as long as it causes no chemical change in the corresponding battery and has high conductivity. For example, the current collector may include copper, stainless steel, aluminum, nickel, titanium, baked carbon, or copper or stainless steel surface-treated with carbon, nickel, titanium, silver, etc., aluminum-cadmium alloy, or the like. In addition, the current collector may have various forms, such as a film, sheet, foil, net, porous body, foam and a non-woven web, which have fine surface irregularities or not.

The current collector may have a thickness of 5-30 μm. According to an embodiment of the present disclosure, the lower limit of the thickness of the current collector may be 5 μm, 7 μm, 10 μm or more, and the upper limit thereof may be 20 μm, 25 μm, 20 μm or less. The thickness of the current collector may be within a range of a combination of each of the lower limits with the upper limits. Within the above-defined range, the negative electrode active material layer may be supported by the current collector and shows a small decrease in energy density per unit volume of the negative electrode.

According to an embodiment of the present disclosure, the negative electrode may include a negative electrode active material layer disposed on the current collector. The negative electrode active material layer may include lithium metal as a negative electrode active material. According to an embodiment of the present disclosure, the negative electrode active material layer may include at least one of metal foil, metal alloy and powder thereof.

According to an embodiment of the present disclosure, the negative electrode active material includes lithium metal, and may further include at least one selected from the group consisting of lithium alloys, lithium metal composite oxides, lithiated titanium composite oxides (LTO) and combinations thereof. Herein, the lithium alloys include an element capable of forming an alloy with lithium, and particular examples of the element capable of forming an alloy with lithium include Si, Sn, C, Pt, Ir, Ni, Cu, Ti, Na, K, Rb, Cs, Fr, Be, Mg, Ca, Sr, Sb, Pb, In, Zn, Ba, Ra, Ge, Al or alloys thereof.

The negative electrode active material layer may have a thickness of 5-40 μm. According to an embodiment of the present disclosure, the negative electrode active material layer may have a thickness of 5 μm, 7 μm, 10 μm or more within the above-defined range, and 40 μm, 30 μm or 20 μm or less within the above-defined range. For example, the negative electrode active material layer may have a thickness of 5-30 μm, or 7-40 μm. Within the above-defined range, lithium ions can be diffused sufficiently into the negative electrode active material layer.

According to an embodiment of the present disclosure, the negative electrode active material layer may be formed by coating, binding, pressing or depositing metal foil onto a planar current collector. In a variant, the negative electrode active material layer may be formed by applying metal powder onto a current collector. Meanwhile, the negative electrode active material layer may consist of lithium metal foil or lithium metal alloy alone, without using a current collector. According to an embodiment of the present disclosure, the negative electrode active material layer may be formed by physically binding or pressing lithium metal to a current collector. According to an embodiment of the present disclosure, the negative electrode active material layer may be formed by electrodeposition or chemical vapor deposition of lithium metal on a current collector.

There is no particular limitation in the positive electrode used in combination with the negative electrode according to the present disclosure, and the positive electrode may be formed by binding a positive electrode active material to a positive electrode current collector by a conventional method known to those skilled in the art. Non-limiting examples of the positive electrode active material include any positive electrode active materials used conventionally for a positive electrode of an electrochemical device. Particularly, lithium manganese oxides, lithium cobalt oxides, lithium nickel oxides, lithium iron oxides, or lithium composite oxides including a combination thereof may be used preferably.

In another aspect of the present disclosure, there is provided a method for manufacturing the above-described lithium secondary battery.

First, a protective layer is disposed on a negative electrode.

There is no particular limitation in the method for disposing a protective layer, and any method used conventionally in the art may be used depending on materials of the protective layer. For example, conventional methods for forming a layer, such as doctor blade coating, solution casting, dip coating, spray coating, spin coating, physical vapor deposition (PVD) using sputtering, atomic layer deposition (ALD) using chemical vapor deposition (CVD), or the like, may be used.

Next, a volume-expandable layer is disposed on a separating layer.

Particularly, the above-mentioned polymer is dissolved in a solvent to prepare a polymer solution, and inorganic particles are introduced to the polymer solution to prepare a composition for forming a volume-expandable layer. The polymer solution and composition may be subjected to an agitation process for the purpose of homogeneous dispersion of the ingredients introduced to the solvent. The solvent may include at least one selected from ethanol, toluene, tetrahydrofuran, ethylene, acetone, chloroform and dimethylformamide (DMF).

Then, the composition for forming a volume-expandable layer is coated on the separating layer. Herein, there is no particular limitation in the method for disposing a volume-expandable layer, and any method used conventionally in the art may be used with no particular limitation. For example, conventional methods for forming a layer, such as doctor blade coating, solution casting, dip coating, spray coating, spin coating, physical vapor deposition (PVD) using sputtering, atomic layer deposition (ALD) using chemical vapor deposition (CVD), or the like, may be used.

After that, the negative electrode, the protective layer, the volume-expandable layer and the positive electrode are stacked successively in such a manner that the negative electrode provided with the protective layer may be face the separating layer provided with the volume-expandable layer to obtain an electrode assembly.

The stacking method is not particularly limited, and any conventional method used in the art may be used with no particular limitation.

Meanwhile, when a liquid electrolyte is applied to the obtained electrode assembly, the electrode assembly is introduced to a pouch, and then a liquid electrolyte may be injected thereto. On the contrary, when using a solid electrolyte, any additional step for introducing an electrolyte is not required, since the separating layer is a solid electrolyte.

In still another aspect of the present disclosure, there are provided a battery module including the secondary battery as a unit cell, a battery pack including the battery module, and a device including the battery pack as a power source. Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

Example 1

1. Preparation of Separating Layer Having Volume-Expandable Layer Disposed Thereon First, Si (Sigma-Aldrich, <100 nm) as inorganic particles and PVDF-HFP (5% HFP, Mw 800,000) as a binder were agitated overnight at a weight ratio of 8:2 in a N-methyl-2-pyrrolidone as a solvent with a concentration of 10 wt % to prepare slurry. The slurry was spin coated on a separating layer (polyethylene porous polymer substrate, Asahi, ND307B) at a rate of 1000 rpm for 1 minute. Next, the resultant structure was vacuum dried at 80° C. for 12 hours to obtain a separating layer provided with a volume-expandable layer. Herein, the volume-expandable layer had a thickness of 0.5 µm and a loading amount of 0.99 g/m$^2$, and the separating layer provided with the volume-expandable layer showed an air permeability of 273 sec/100 cc. The Si inorganic particles showed a volume expansion ratio of 300% after lithiation, on the basis of the volume before lithiation. In addition, the inorganic particles were used at 80 parts by weight based on 100 parts by weight of the volume-expandable layer.

2. Manufacture of Negative Electrode Provided with Protective Layer

A preliminarily prepared binder solution of 5 wt % PVDF-HFP (5% HFP, Mw 800,000) was spin coated on Li metal (thickness 20 µm, Honjo) at 2000 rpm for 1 minute and dried at room temperature for 12 hours to obtain a Li metal negative electrode provided with a protective layer.

3. Manufacture of Positive Electrode

First, $LiNi_{0.8}Co_{0.1}Mn_{0.1}O_2$ (NCM811) as a positive electrode active material, FX35 as a conductive material and PVDF as a binder were mixed at a weight ratio of 96:2:2, and the resultant mixture was introduced to and agitated in N-methyl-2-pyrrolidone as a solvent, thereby preparing slurry. The slurry was applied onto an aluminum current collector having a thickness of 20 µm by using a doctor blade, and the resultant mixture was vacuum dried at 120° C. for 4 hours. Then, the vacuum dried product was pressed by using a roll press to obtain a positive electrode having a loading amount of positive electrode slurry of 3 mA/cm$^2$ and a porosity of 22%.

4. Manufacture of Battery

The positive electrode was cut into a circular shape having an area of 1.4875 cm². In addition, a lithium metal foil coated with a protective layer cut into a circular shape having an area of 1.7671 cm² was prepared as a negative electrode. The separating layer provided with a volume-expandable layer was interposed between both electrodes, and a liquid electrolyte (EC:EMC=3:7 (volume %), 1M LIPF$_6$, 0.5 wt % of vinylene carbonate, 1 wt % of FEC) was injected thereto to obtain a coin-type half-cell. Herein, the separating layer was disposed in such a manner that the side of the separating layer, not coated with the volume-expandable layer, might face the positive electrode.

The obtained battery was charged/discharged at room temperature to determine initial discharge capacity.

Charge condition: constant current (CC)/constant voltage (CV), (4.0V, 0.1 C-rate, 0.05 C current cut-off)

Discharge condition: constant current (CC) 3V, (0.1 C-rate)

In addition, after the evaluation of initial discharge capacity, the battery was charged at 0.3 C-rate and discharged at 0.5 C-rate to evaluate life characteristics. The time point of Li dendrite formation was determined by checking the profile during charge and analyzing a drop in voltage caused by a short.

Example 2

A separating layer and a cell were obtained and evaluated in the same manner as Example 1, except that the volume-expandable layer had a composition of Si:PVDF=9:1. Herein, the volume-expandable layer had a thickness of 0.5 µm and a loading amount of 1.01 g/m², and the separating layer provided with the volume-expandable layer showed an air permeability of 258 sec/100 cc. In addition, the inorganic particles were used at 90 parts by weight based on 100 parts by weight of the volume-expandable layer.

Example 3

A separating layer and a cell were obtained and evaluated in the same manner as Example 1, except that the volume-expandable layer had a thickness of 1 µm and a loading amount of 1.98 g/m², and the separating layer provided with the volume-expandable layer showed an air permeability of 281 sec/100 cc.

Example 4

A lithium secondary battery was obtained in the same manner as Example 1, except that the volume-expandable layer was prepared by using SnO$_2$ (Sigma-Aldrich, <100 nm) was used instead of Si (Sigma-Aldrich, <100 nm) as inorganic particles. Herein, the volume-expandable layer had a thickness of 0.5 µm and a loading amount of 2.66 g/m², and the separating layer provided with the volume-expandable layer showed an air permeability of 265 sec/100 cc.

Comparative Example 1

A lithium secondary battery was obtained by using, instead of a volume-expandable layer, a separating layer provided with a porous coating layer including Al$_2$O$_3$ as inorganic particles and PVDF as a binder polymer at a ratio of 20:80. Herein, the porous coating layer had a thickness of 2.5 µm and a loading amount of 8.1 g/m², and the separating layer provided with the porous coating layer showed an air permeability of 260 sec/100 cc.

Comparative Example 2

A lithium secondary battery was obtained in the same manner as Example 1, except that the negative electrode had no protective layer.

In other words, Li metal (thickness 20 µm, Honjo) was prepared as a negative electrode. Then, the separating layer provided with a volume-expandable layer according to Example 1 and the positive electrode were stacked successively on the negative electrode to provide a lithium secondary battery.

Comparative Example 3

A lithium secondary battery was obtained in the same manner as Example 3, except that a porous inorganic layer was used instead of the protective layer.

Particularly, the porous inorganic layer was prepared as follows.

First, PVDF-HFP as a binder polymer was introduced to N-methyl-2-pyrrolidone as a solvent and dissolved at 50° C. therein for about 4 hours to prepare a binder polymer solution. Next, Al$_2$O$_3$ (particle size: 500 nm, US Research nanomaterials, Inc.) as inorganic particles was introduced to the prepared binder solution, and the inorganic particles were pulverized and dispersed through a ball milling process for 12 hours to prepare slurry for forming a porous coating layer. Herein, the ratio of the inorganic particles:binder polymer was 80:20.

The slurry for forming a porous coating layer was applied to and dried on a release film, and then the release film was removed. The resultant porous coating layer had a thickness of about 3 µm.

TABLE 1

| | Charge capacity (mAh/g, 4.25 V) | Discharge capacity (mAh/g, 4.25 V) | Efficiency (%) | Short generation point (cycle No.) | Behavior of battery after short generation point |
|---|---|---|---|---|---|
| Ex. 1 | 225.1 | 201.8 | 89.6 | 42 | Not work |
| Ex. 2 | 225.8 | 203.3 | 90.0 | 44 | Not work |
| Ex. 3 | 225.3 | 201.9 | 89.6 | 45 | Not work |
| Ex. 4 | 224.5 | 202.5 | 90.2 | 50 | Not work |
| Comp. Ex. 1 | 225.2 | 202.4 | 89.9 | 48 | Risk of subsequent event (vent, ignition, explosion, etc.) |
| Comp. Ex. 2 | 218.5 | 182.2 | 83.4 | 14 | Not work |
| Comp. Ex. 3 | 221.7 | 198.2 | 89.4 | 38 | Not work |

As shown in Table 1, even when the same electrodes are used, use of the separating layer provided with a volume-expandable layer shows a different short generation point. In the battery according to Comparative Example 1, a micro-short occurs at the 48$^{th}$ cycle due to lithium dendrite, and a risk of ignition or explosion exists, if the battery is further operated. On the contrary, in the case of the batteries according to Examples, it can be seen that lithium dendrite does not meet the positive electrode to generate a micro-short, but meets the volume-expandable material to interrupt any subsequent event in advance through the degradation of performance. In the case of Comparative Example 2, a part of the inorganic particles (b) exposed from the surface of the separating layer are in direct contact with the Li metal negative electrode having no protective layer, and thus the charge/discharge cycles proceed with significantly high resistance from the initial stage, thereby providing a significantly low capacity and efficiency. In addition, in this case, life characteristics are degraded significantly and the battery provides poor service life due to such high initial resistance. In the case of Comparative Example 3, although the volume-expandable layer and the current collector are interrupted electrically or physically by using the inorganic particles, the battery shows increased resistance and low capacity due to an increase in thickness and tortuosity.

Test Examples (1) Determination of Initial Charge/Discharge Capacity

Each of the batteries was charged/discharged at room temperature to determine initial discharge capacity.
Charge condition: CC/CV (4.0V, 0.1 C-rate, 0.05 C current cut-off)
Discharge condition: CC (3V, 0.1 C-rate)

(2) Evaluation of Battery Life

After the determination of initial discharge capacity, each battery was charged (0.3 C-rate) and discharged (0.5 C-rate) to evaluate life characteristics.

(3) Short Generation Point

The profile of each battery during charge was checked and a drop in voltage caused by a short was analyzed to determine the short generation point.

(4) Determination of Air Permeability of Separating Layer Provided with Volume-Expandable Layer The air permeability of each separating layer provided with a volume-expandable layer was determined according to JIS P-8117 by using a Gurley air permeability tester.

(5) Determination of Volume Expansion Ratio

It is difficult to determine the direct volume expansion ratio of inorganic particles. Therefore, the size of inorganic particles after lithiation is compared with the size thereof before lithiation, and the volume expansion ratio is calculated according to the following formula:

Volume expansion ratio: (Thickness of electrode including inorganic particles after lithiation−Thickness of electrode including inorganic particles before lithiation)/(Thickness of electrode including inorganic particles before lithiation)×100%

DESCRIPTION OF DRAWING NUMERALS

100, 200: Lithium secondary battery
10: Negative electrode
20: Positive electrode
21: Positive electrode current collector
22: Positive electrode active material
23: Conductive material
24: Solid electrolyte
30: Separating layer
40: Protective layer
50: Volume-expandable layer
51: Inorganic particles
52: Inorganic particles lithiated with lithium or lithium ions

What is claimed is:

1. A lithium secondary battery comprising:
a negative electrode;
a protective layer disposed on the negative electrode;
a volume-expandable layer disposed on the protective layer;
a separating layer disposed on the volume-expandable layer;
a positive electrode disposed on the separating layer; and
an electrolyte,
wherein the volume-expandable layer comprises: a binder polymer (a); and inorganic particles (b) capable of reacting with lithium ions or lithium intercalation,
wherein during operation of the battery, the inorganic particles (b) undergo lithiation through a physical, chemical or electrochemical reaction with lithium ions or lithium, and the inorganic particles (b) comprise one or more of a metal or a metal oxide undergoing volume expansion through lithiation,
wherein the inorganic particles (b) show a volume expansion ratio of 10-1000% after lithiation, on a basis of a volume of the inorganic particles (b) before lithiation,
wherein the inorganic particles (b) comprise Si, Sn, $MnO_2$, or mixtures thereof, and
wherein the inorganic particles (b) are present in an amount of 20-90 parts by weight based on 100 parts by weight of the volume-expandable layer.

2. The lithium secondary battery according to claim 1, wherein the protective layer is a polymer layer.

3. The lithium secondary battery according to claim 2, wherein the polymer layer has an electrical insulation property and includes a polymer.

4. The lithium secondary battery according to claim 3, wherein the polymer layer comprises at least one polymer selected from the group consisting of polyvinylidene fluoride, polyvinyl chloride, polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinylidene fluoride, polyvinyl acetate, polyethylene, polypropylene, polyethylene-co-vinyl acetate, polyethylene oxide, polypropylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, and mixtures thereof.

5. The lithium secondary battery according to claim 1, wherein the volume-expandable layer has a thickness of 10 nm to 50 μm.

6. The lithium secondary battery according to claim 1, wherein the electrolyte is a solid electrolyte or a liquid electrolyte.

7. The lithium secondary battery according to claim 6, wherein the protective layer, the volume-expandable layer and the separating layer each comprise pores, wherein the pores are impregnated with the solid electrolyte or the liquid electrolyte.

8. The lithium secondary battery according to claim 1, wherein the binder polymer (a) includes at least one polymer selected from the group consisting of polyvinylidene fluoride, polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, and mixtures thereof.

9. The lithium secondary battery according to claim 1, wherein the separating layer comprises a porous polymer film substrate or a porous polymer non-woven web substrate.

10. A method for manufacturing a lithium secondary battery comprising a negative electrode, a protective layer disposed on the negative electrode, a volume-expandable layer disposed on the protective layer, a separating layer disposed on the volume-expandable layer, a positive electrode disposed on the separating layer, and an electrolyte, the method comprising:
   disposing the protective layer on the negative electrode;
   disposing the volume-expandable layer on the separating layer; and
   stacking the negative electrode, the protective layer, the volume-expandable layer, the separating layer and the positive electrode, successively,
   wherein the volume-expandable layer comprises: a binder polymer (a); and inorganic particles (b) capable of reacting with lithium ions or lithium intercalation,
   wherein during operation of the battery, the inorganic particles (b) undergo lithiation through a physical, chemical or electrochemical reaction with lithium ions or lithium, and the inorganic particles (b) comprise one or more of a metal or a metal oxide undergoing volume expansion through lithiation,
   wherein the inorganic particles (b) show a volume expansion ratio of 10-1000% after lithiation, on a basis of a volume of the inorganic particles (b) before lithiation,
   wherein the inorganic particles (b) comprise Si, Sn, $MnO_2$, or mixtures thereof, and
   wherein the inorganic particles (b) are present in an amount of 20-90 parts by weight based on 100 parts by weight of the volume-expandable layer.

11. The lithium secondary battery according to claim 1, wherein the inorganic particles (b) comprise Si, $MnO_2$, or mixtures thereof.

12. The method according to claim 10, wherein the inorganic particles (b) comprise Si, $MnO_2$, or mixtures thereof.

* * * * *